US012354455B1

(12) United States Patent
Warnick et al.

(10) Patent No.: US 12,354,455 B1
(45) Date of Patent: Jul. 8, 2025

(54) WEARABLE SYSTEM FOR SOCIAL DISTANCING

(71) Applicant: UIPCO, LLC, San Antonio, TX (US)

(72) Inventors: Mark Paxman Warnick, San Antonio, TX (US); Elena Marie Carrasco, Converse, TX (US); Celena Dortch, San Antonio, TX (US); Justin Dax Haslam, San Antonio, TX (US); David Jason Anderson James, San Antonio, TX (US); Quian Antony Jones, San Antonio, TX (US); Rosa Maria Smith, San Antonio, TX (US); Katrina Marie Zell, New Braunfels, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 192 days.

(21) Appl. No.: 18/068,026

(22) Filed: Dec. 19, 2022

Related U.S. Application Data

(60) Provisional application No. 63/292,031, filed on Dec. 21, 2021.

(51) Int. Cl.
*G08B 21/02* (2006.01)

(52) U.S. Cl.
CPC .................................... *G08B 21/02* (2013.01)

(58) Field of Classification Search
CPC .......... G08B 21/02; G01S 15/08; G01S 15/88
See application file for complete search history.

(56) References Cited

U.S. PATENT DOCUMENTS

| | | | | |
|---|---|---|---|---|
| 10,169,978 | B1 * | 1/2019 | Brooks | G08B 21/02 |
| 10,976,432 | B2 * | 4/2021 | Schediwy | G01S 15/89 |
| 11,265,635 | B2 * | 3/2022 | Shankar | H04M 1/72412 |
| 11,417,193 | B2 * | 8/2022 | Mamishev | G08B 21/24 |
| 11,626,001 | B1 * | 4/2023 | Khmelev | G08B 21/12<br>340/532 |
| 11,935,384 | B1 * | 3/2024 | Khmelev | G08B 21/0453 |
| 11,944,428 | B2 * | 4/2024 | Kim | G08B 6/00 |
| 2008/0101159 | A1 * | 5/2008 | Pope | B63C 11/26<br>367/131 |
| 2012/0305770 | A1 * | 12/2012 | Minera | A41D 1/002<br>250/206 |
| 2014/0088443 | A1 * | 3/2014 | Van Den Heuvel | A61B 5/7282<br>600/483 |
| 2016/0327979 | A1 * | 11/2016 | Lettow | H05B 3/145 |
| 2017/0323155 | A1 * | 11/2017 | Biswas | G01S 15/86 |
| 2018/0108225 | A1 * | 4/2018 | Mappus | G08B 6/00 |
| 2018/0292523 | A1 * | 10/2018 | Orenstein | A61B 5/1113 |
| 2019/0000332 | A1 * | 1/2019 | Li | H01M 10/465 |
| 2020/0173783 | A1 * | 6/2020 | Anantha | G06T 7/70 |

(Continued)

*Primary Examiner* — Adnan Aziz

(74) *Attorney, Agent, or Firm* — Plumsea Law Group, LLC

(57) ABSTRACT

The disclosed wearable device systems include several features for alerting and guiding persons who are approaching other persons in order to promote social distancing. Sensor data from wearable devices that are disposed in an article of apparel are used to determine the presence of a human person within a detection zone around the article of apparel. The detection zone is created based on sound waves generated by sonar-based proximity detectors mounted on the article of apparel. The system could be used to warn a person who breaches the user's detection zone to maintain a safe distance.

19 Claims, 10 Drawing Sheets

(56) References Cited

U.S. PATENT DOCUMENTS

| | | | | |
|---|---|---|---|---|
| 2021/0074099 | A1* | 3/2021 | Caroselli | G06V 10/82 |
| 2021/0248890 | A1* | 8/2021 | Shaw | G08B 21/02 |
| 2021/0335120 | A1* | 10/2021 | Mamishev | G08B 21/0225 |
| 2022/0238129 | A1* | 7/2022 | Angkititrakul | H04B 1/38 |
| 2022/0331461 | A1* | 10/2022 | Tsinberg | G01S 15/04 |

* cited by examiner

WEARABLE SYSTEM FOR SOCIAL DISTANCING

CROSS-REFERENCE TO RELATED APPLICATION

This application claims the benefit of U.S. Provisional Patent Application Ser. No. 63/292,031 filed on Dec. 21, 2021 and titled "Wearable System for Social Distancing", the disclosure of which is incorporated by reference herein in its entirety.

TECHNICAL FIELD

The present disclosure generally relates to a system for facilitating social distancing between people and, more particularly, to a system that utilizes real-time sensor data collected by one or more wearable devices to detect the presence of persons within a predefined range of the wearer.

BACKGROUND

Social (physical) distancing is a public health practice that aims to prevent individuals from coming in close contact with potentially infected persons in order to reduce opportunities for disease transmission. Social distancing therefore aims to deliberately increase the physical space between people to avoid spreading illness by reducing groups of people and crowded spaces. However, other than encouraging personal awareness and an individual's assertion of space, there is no current system in place to provide individuals with a mechanism by which to detect and alert if someone moves closer than the safe distance, six feet being a common recommendation. In addition, individuals who do notice when others approach too closely can sometimes feel inhibited expressing their desire that the other person also participate in social distancing. Furthermore, there may be individuals who are particularly vulnerable for whom maintaining a safe space is of greater importance. In addition, there may be persons who for other (non-health related) reasons desire a system that protects their personal space.

There is a need in the art for a system and method that address the shortcomings discussed above.

SUMMARY

In one aspect, a wearable proximity alert system for an article of apparel can include a plurality of sonar emitters disposed along multiple regions of the article of apparel. Each sonar emitter is configured to produce a sound wave that travels in a specified direction relative to a central axis of the article of apparel. The system also includes a plurality of sonar detectors disposed in the article of apparel, each sonar detector configured to detect sonic echoes reflected off objects in response to the sound waves produced by the plurality of sonar emitters, and a system controller configured to communicate with the plurality of sonar detectors to determine when there is a high likelihood of a detected object representing a person.

In another aspect, a wearable proximity alert system for headwear is disclosed. The system includes a substantially O-shaped guide rail extending around an exterior surface of a body portion (crown) of the headwear, a sensor unit including a sonar emitter configured to produce a sound wave and a sonar detector configured to detect sonic echoes reflected off objects in response to the sound wave produced by the sonar emitter, the sensor unit being mounted on the guided rail, and a system controller configured to manage a rotational motion of the sensor unit around the body portion, such that the sound waves produced by the sonar emitter travel in a first direction at a first time, and in a different, second direction at a subsequent, second time.

In another aspect, a method of promoting social distancing and providing alerts to users of a wearable proximity alert system and other persons is disclosed. A first step includes producing, via a first sonar emitter associated with an article of apparel, a first sound wave extending along a first direction, and a second step includes receiving, at a system controller and from a first sonar detector associated with the article of apparel, first data about a first object located within a first range of the article of apparel. A third step includes determining, at the system controller, that the first object has a high likelihood of corresponding to a person, and a fourth step includes producing, at a first speaker associated with the article of apparel, a warning message directed toward the person.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The disclosed wearable device systems include several features for alerting and guiding persons who are approaching or have breached a predefined safe zone associated with the wearer of the systems. In some embodiments, the system can alert and/or guide the wearer regarding the approach of a person or persons that have disregarded social distancing conventions. In one example, the disclosed systems include devices configured to receive sensor data from wearable devices (also referred to herein as "wearables"), such as smart devices embedded in articles of apparel, to detect the presence of other persons in the user's vicinity. In some embodiments, the device is configured to provide user notifications when the safe zone has been encroached by another individual. In another example, the system can be configured to alert the user when there is a person(s) near their safe zone that is likely to come in proximity to the user.

In some examples, the system comprises a detection and targeted warning system. For example, in one embodiment, the system uses sonar to detect the presence of other people in the user's vicinity. If someone moves into a predefined "bubble" around the user, the system can present a warning or other informational message that is targeted at the encroaching person. In some cases, targeting is achieved using a directional microphone array that can be pointed at the person and emits a message or sound that can only be heard by that user. The messages could include an audible request that the person keep at least six feet away (or some other distance) from the user. In other embodiments, detection could be done using any other kinds of sensors, as will be discussed below.

As described herein, the proposed systems and methods contemplate an arrangement in which one or more wearables including one or more sensors would be used to warn a person if they are in close quarters (e.g., one to ten foot range, selected by the wearer) with another person. For purposes of this disclosure, the term wearable (also referred to as "article of apparel") refers to any garment, footwear, or accessory configured to be worn on or carried by a human. Some non-limiting examples of articles of apparel include tops, bottoms, outerwear, helmets, hats, caps, shirts, jackets, coats, vests, undershirts, tank tops, pants, leggings, gloves, scarves, armbands, headbands, jewelry, hair clips, belts, waist bands, belt bags ("fanny packs"), shorts, sleeves, knee pads, elbow pads, socks, shoes, boots, backpacks, duffel bags, cinch sacks, and straps, as well as numerous other products configured to be worn on or carried by a person, including accessories such as jewelry, watches, glasses, and badges. In some cases, the article of apparel can also be worn by an animal or disposed on another article carried by or in possession of the user.

Figure 1A:
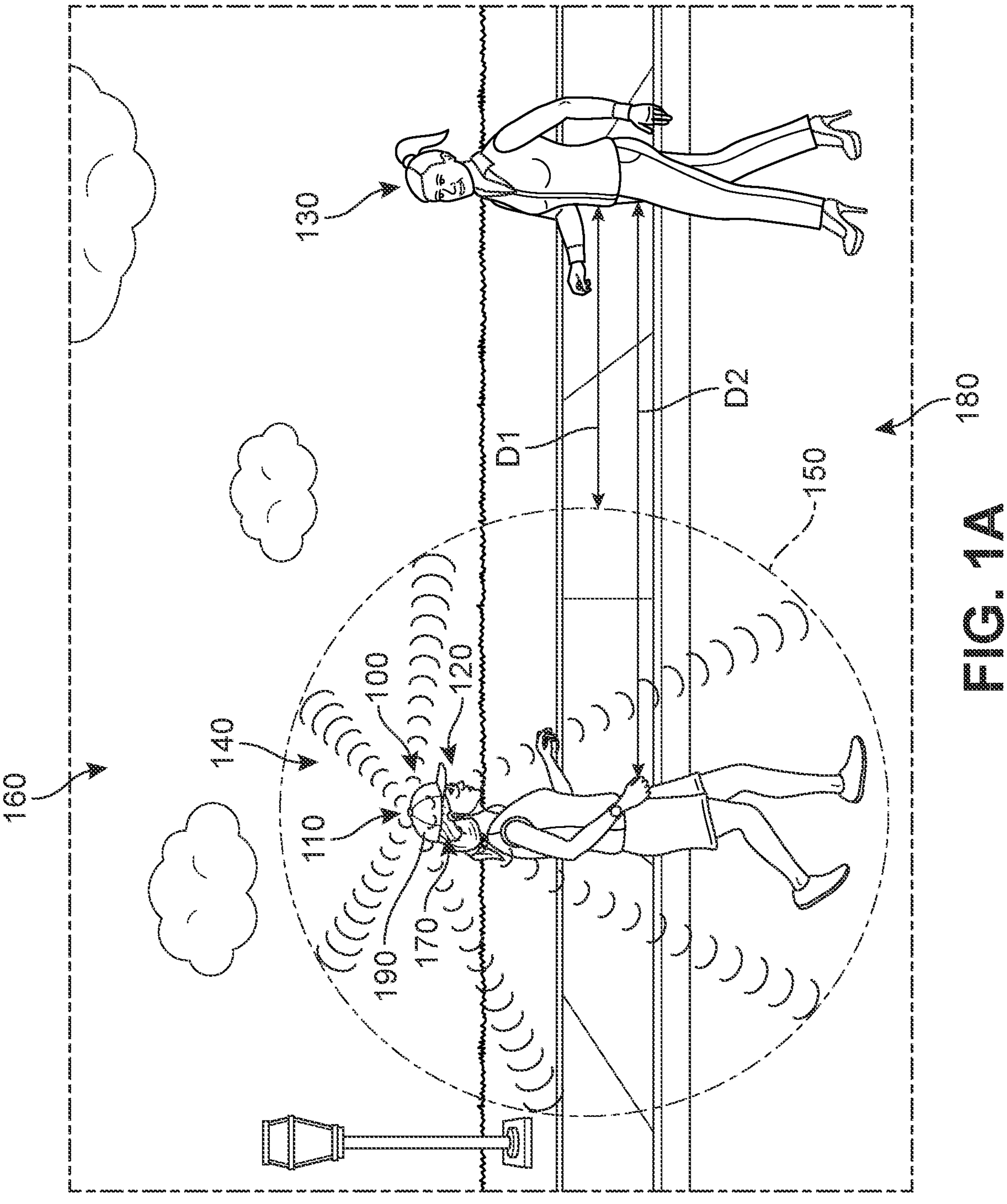
FIGS. 1A and 1B depict a scenario in which a wearable proximity alert system produces an audible warning to an approaching person, according to an embodiment.
Figure 1B:
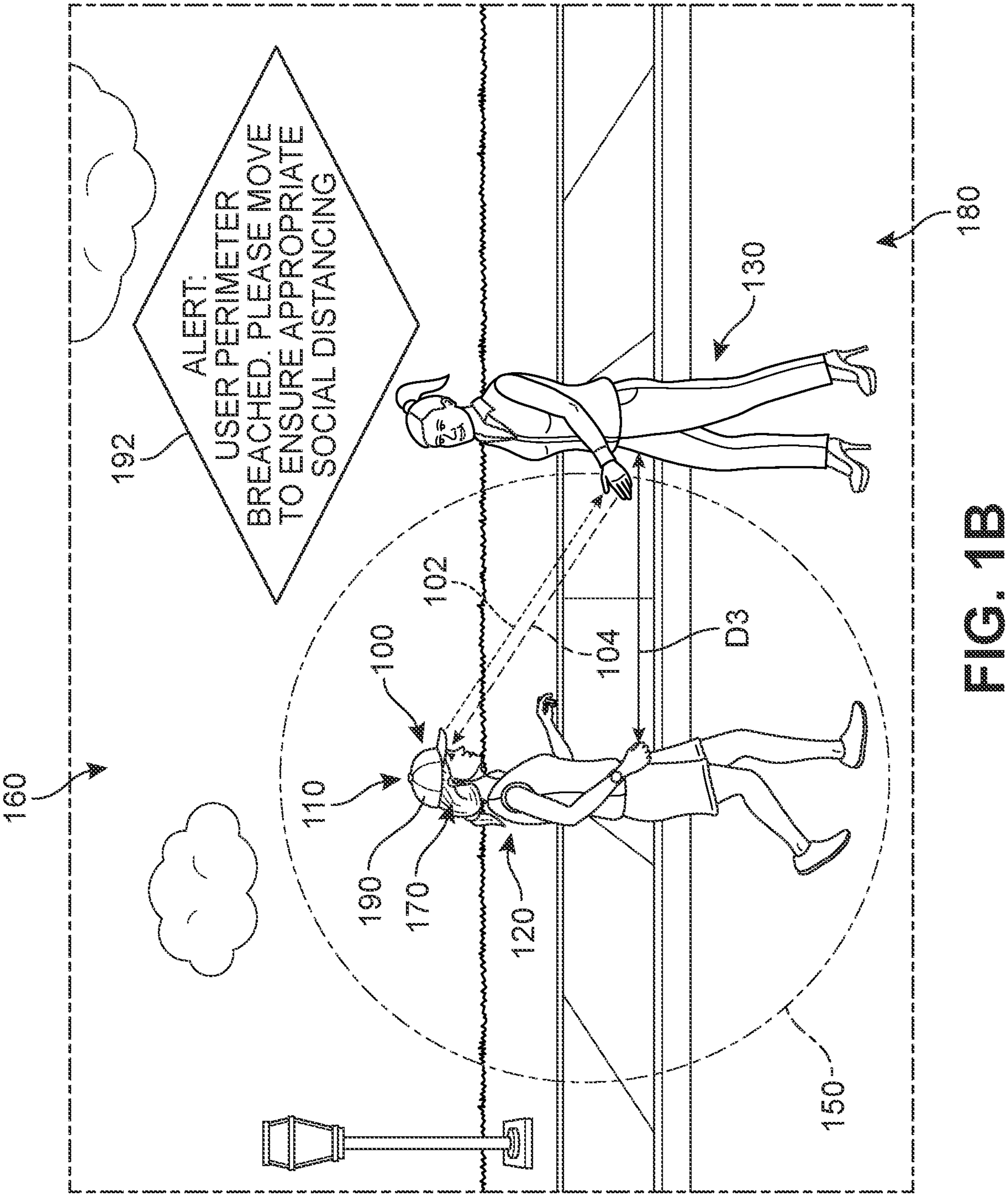

For purposes of clarity, an overview of one embodiment of the proposed systems and methods is illustrated with reference to FIGS. 1A and 1B. FIG. 1A is an illustration of a first user 120 employing an embodiment of a wearable proximity alert system ("alert system") 100 as she walks through a suburban area 160. As shown in FIG. 1A, the alert system 100 comprises a first article of apparel ("first article") 190 (shown here as an article of clothing comprising a cap or hat) in which a plurality of devices 110 such as sensors, wireless connectivity components, processors, sonar emitters (e.g., speakers), and/or sonic detectors (e.g., microphones) have been embedded or otherwise attached to the first article 190 worn by first user 120. In this case, the hat simply rests on the first user's head. In some embodiments, the first article 190 also includes a system controller, which in this case may be disposed toward a center of the first article 190. In other embodiments, the system controller can be positioned elsewhere on the article, or be remotely located relative to the first article 190.

In FIG. 1A, first user 120 is a jogger moving along sidewalk 180, and so is in generally constant motion. For purposes of this example, as first user 120 jogs, she also wears a set of headphones 170 from which she can listen to music. In some examples, the alert system 100 is configured to produce an audible alert via headphones 170 to warn the first user 120 of someone approaching or breaching their detection zone 150. For purposes of this application, the detection zone is a modifiable perimeter that extends from the first article 190 in the form of multiple sound waves 140. The detection zone 150 serves as an invisible barrier which, if breached by what is determined with a high likelihood by the system to be a person, will trigger an alert to the person and/or first user 120. As will be discussed in greater detail below, the detection zone 150 can represent a default region surrounding the first article 190 (and the person wearing the article), or a personalized region whereby the distance from the article and the directions that are covered have been selected to align with the user's desired area. In other words, if the user only wishes to be alerted when someone approaches too closely from the rear, they can select the option to have the system either (a) only generate sound waves 140 that extend toward a rearward direction or (b) only use data obtained by sonic detectors that are configured to detect echoes from the rearward direction.

As first user 120 moves forward, she approaches a first person 130, who is at this time a first distance D1 from the detection zone 150 associated with first user 120, and a larger, second distance D2 from the first user 120. Moving to FIG. 1B, at a second time, both the first person 130 and the first user 120 have closed the distance between them to a third distance D3 that is smaller than the first distance D1. In other words, the first person 130 has moved into the region around the first user 120 demarcated by the detection zone 150. As a first sound wave 102 extends outward from a sonic emitter (not shown in FIG. 1B) disposed on the first article 190, it 'hits' or bounces off of part of the first person 130 as a first echo 104. The first echo 104 is received by a sonic detector (not shown in FIG. 1B). The data is processed by the system controller, along with additional echo data prior to and subsequent to the second time, and the system determines that an object with a high likelihood of being a person has breached the detection zone 150. In response to this determination, the alert system 100 can be configured to generate and present an audible warning from one or more speakers disposed on or otherwise connected to the system controller. In this example, an alert 192 ("Alert: User perimeter breached: Please move to ensure appropriate social distancing") has been produced by a speaker to remind first person 130 to maintain a safe distance.

In different embodiments, the alert content can vary widely, based on the data (e.g., whether the object is to the back or front, how close the object is determined to be, etc.) as well as on the user's own preferences. For example, in different embodiments, such audio output can be personalized and/or selected from a list of available audio types. Various types of sounds can be incorporated into the warning, and volume, speed of playback, and voice type can be adjusted to correspond to the user's preferences. The spoken words can be entered by the user or pre-selected by the system defaults. For example, additional spoken navigation type directions may be produced, such as "Move forward", "Go to your left". In some embodiments, rather than spoken utterances, the audible alert or message can be conveyed by different types of sounds (e.g., shrill whistles, ringing, beeps, chimes, tones, etc.) that can change in type, intensity (e.g., loudness or sound level), and frequency based on the device's proximity to the detected unsafe condition. In other cases, the alert can be presented by proprioceptive or haptic feedback emitted by the wearable article that can optionally include one or more haptic feedback components that produce various types of vibrations or other touch-based information to the user in order to convey information. As one non-limiting example, the frequency and/or intensity (i.e., strength) of the vibration can increase as proximity to the unsafe condition increases, and decrease as proximity decreases. It will also be noted that while the article of apparel is illustrated as being configured to be worn on the head of the wearer, in other embodiments, the system may be designed for wearables worn on other parts of the body. For example, other types of wearable devices may be worn around the neck, arm, or waist; attached to clothing; or worn in any other manner.

Figure 2:
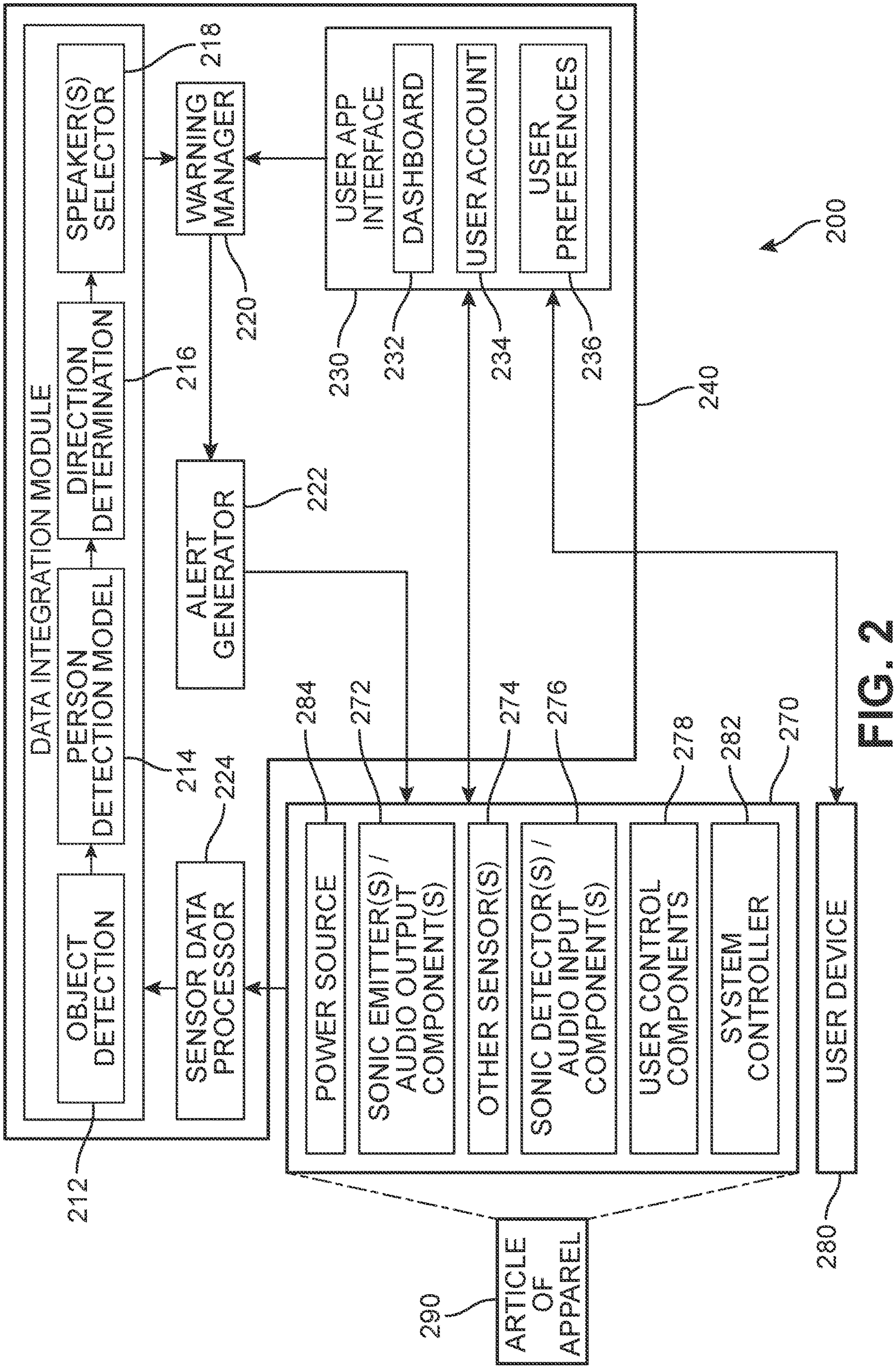
FIG. 2 is a schematic diagram of a wearable proximity alert system, according to an embodiment.

In order to provide the reader with a greater appreciation of some of the embodiments, FIG. 2 depicts a schematic overview of an embodiment of a wearable proximity alert system architecture 200. In the embodiment of FIG. 2, the architecture 200 includes a data management system ("data manager") 240 that is in communication with hardware assembly 270. In different embodiments, a system controller 282 for the hardware assembly 270 includes some or all modules of the data manager 240 (i.e., local storage for the controller). In other embodiments, some or all modules of the data manager 240 communicates with hardware assembly 270 through a wireless connection such as Wide Area Networks (WANs), Wi-Fi networks, Bluetooth or other Personal Area Networks, cellular networks, as well as other kinds of networks. Thus, though not shown here, hardware assembly 270 can further include a communication module that is configured to enable communications between various software modules and hardware components. It may be appreciated that different modules could communicate using different networks and/or communication protocols. In some embodiments, components of the system may communicate with one or more remote systems over a network, where network could comprise any wide area network, local area network or other suitable network. In different embodiments, network could include one or more Wide Area Networks (WANs), Wi-Fi networks, Bluetooth or other Personal Area Networks, cellular networks, as well as other kinds of networks. The modules can include computing or smart devices as well as simpler IoT devices configured with a communications module. The communication module may include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. In many cases, the communication module is a wireless connection; however, wired connections may also be used. For example, the communication module may include a wired serial bus such as a universal serial bus or a parallel bus, among other connections. In some cases, the communication module for the system enables the system to communicate over a network with one or more external database systems. Each external database system can include a server (including processors and memory) and a database. The system may both send and receive information to and from these remote databases. Moreover, it may also be appreciated that in other embodiments, one or more of these databases (or parts of the databases) could be locally disposed within the system.

As shown in FIG. 2, the hardware assembly 270 includes a power source 284, one or more sonic emitters and/or audio output components ("emitter(s)") 272, one or more sonic detectors and/or audio input components ("detector(s)"), and the system controller 282. In some embodiments, the hardware assembly 270 can optionally include user control components 278 (e.g., a power on/off switch, volume adjustment, mode selector, charging indicator light, etc.) and/or one or more other sensor(s) 274. In some embodiments, power source 274 is a rechargeable battery, which may be recharged by the user by a charger cable, wirelessly, or a solar powered battery that can be charged by solar cells. In one embodiment, an article of apparel ("article") 290 can include one or more solar cells distributed throughout the external surface of the wearable and is connected to the power source 284 for charging. However, various other embodiments also contemplate other independent power supplies including, but not limited to: batteries and rechargeable power sources (e.g., energy harvesting sensors/batteries), kinetic energy mini-generator devices, vibration harvesting devices (e.g., a vibration-powered generator) and the like. In some embodiments, the hardware assembly 270 can be completely self-contained, locally including the necessary software to work without a network (internet) connection. In other words, while in some embodiments various modules and components of the system can be configured to connect to or be accessed via a network, it is to be understood that the system is able to fully function and provide alerts while offline. In other words, a user can rely on the system as an independent, comprehensive system that is able to work in areas without a network or in situations where the user does not desire any such connection.

In different embodiments, the system includes provisions for the creation of a presence detection zone ("detection zone") that can extend around some or a substantial entirety of the wearer of the article 290. For example, in some embodiments, the emitter(s) 272 are configured to produce sound waves that form an ultrasonic detection region around the article 290, created by three-dimensional signals emanating from the emitters 272. In different embodiments, each emitter is paired with a detector of detector(s) 216 (forming a monitoring pair) that can be arranged around the article of apparel 290. In one embodiment, the monitoring pairs can be relatively inclined on selected portions of the article 290. For example, in cases where the article 290 is a hat or other head covering, some or all of the pairs can be inclined in a slightly downward direction to provide coverage around the person from others walking nearby (rather than from the air above the person). The system can then emit the signal and "ping", and detect an echo.

The reflected signal strengths and timing can be used to refine more accurately the location of an obstructing object or structure via data integration module 210 (which may be executed at a processor associated with the sensor itself, or at the system controller 282). In essence, each pair contributes diverging but bi-optic (or stereo or 3-D) data reflection components that permit a processor to interpret and then generate (or otherwise assess) 3-D spatial imaging of the physical environment in which the article 290 is currently located. The terms "sound wave", "ping", "signal", "beam", or "pulse" will be used interchangeably as a generalized descriptor to cover and refer to the emissions that are generated to produce the overall detection zone, where an "echo" is the sound wave reflected back toward the system after bouncing off the surface of an object.

In different embodiments, the system can include provisions for adjusting the operation or performance of the system. For example, as a default, the envelope or zone can extend from at least each of the side surfaces (i.e., front, back, left and right) of the article 290. In one embodiment, there may be other inclined directions (top to bottom) included to provide an encapsulating zone around the user. Each emitter is controlled by the system controller 282 to produce a "ping" that can include a relatively narrow beam-shaped 3-D wave extending outwardly from the article 290. The range of each wave can allow for target detection from about 150 millimeters (mm) to about 10,000 mm. A user can select a range limit to reduce the size of the zone or a larger range to increase the sensitivity of the system. When the system is activated, simultaneous sonar-type sound pulses ("pings") are sent from every emitter on the article 290. Corresponding detectors on each surface (detectors are typically be collocated with their emitters) will detect echo responses (often many per sensor) and use this information to "build up" an environment around the article 290. Ultrasonic range finding techniques that can be implemented would be familiar to those skilled in the art.

Although the emitters 272 and detectors 276 are illustrated as separate components, it should be understood that in some embodiments, ultrasonic proximity sensors may be incorporated that provide the functions of both emitter and detector. The ultrasonic proximity sensors emit a sound impulse and measure the elapsed time of the echo from an object and are unaffected by color, transparency, shininess, or lighting conditions. In one example, an ultrasonic proximity switch sensor can be used, where transmitter (emitter) and receiver (detector) are integrated in one housing, and the ultrasound is reflected directly from the object to be measured to the receiver. In such cases, a sonic transducer may be used, which allows for alternate transmission and reception of sound waves. The sound waves emitted by the transducer are reflected by an object and received back in the transducer. After having emitted the sound waves, the ultrasonic sensor will switch to receive mode. The time elapsed between emitting and receiving is proportional to the distance of the object from the sensor. Other embodiments can incorporate retro-reflective sensors and/or through-beam sensors. Thus, for purposes of this application, references to the emitters/detectors also encompass embodiments in which a unitary proximity sensor is used.

As noted above, in different embodiments, the hardware assembly 270 can also include one or more sensors 274. In different embodiments, the sensors 274 can include one or more types of a device, module, machine, or subsystem whose purpose is to detect events or changes in its environment and convey the detected information to the sensor data processor 220, for example via the system controller 282. The article of apparel selected by a user can include some or all of these sensor devices (pre-embedded), and in some cases, there may be multiple instances of the same type of sensor included in the wearable apparel and arranged at different locations around the apparel. Some non-limiting examples of such sensors include (a) Smoke, Gas and Alcohol (and/or other chemicals) sensors; (b) Temperature sensors; (c) Pressure sensors; (d) Cameras and other image and/or light sensors; (e) Smoke/Flame sensors; (f) Moisture/Humidity sensors; (g) Electrostatic sensors; (h) Audio sensors and other sound/volume sensors (e.g., microphones); (i) Motion/speed sensors; (j) Gyroscopes; (k) Accelerometers; (l) Wind Speed sensors; (m) Proximity sensors; and (n) Infrared and Heat sensors. In addition, in some embodiments, sensors 274 can include ultrasonic sensors, touch sensors, aerosol characterization sensors, magnetometers, color sensors, tilt sensors, and flow and level sensors. Thus, in different embodiments, sensors 274 may collect data regarding location, speed, and direction of the user wearing the system and/or of objects near the user. In cases in which temperature sensors are included in the assembly 270, the system can be configured to also monitor the temperatures of nearby people using remote sensing techniques, and detect if someone nearby may have a fever. In such cases, the system could generate a higher level alert (as a louder message or warning sounds).

In addition, in some embodiments, the sensors 274 may include biometric sensors configured to monitor personal data regarding the wearer of the wearable apparel, for example by collecting data from the wearable's heartrate monitor and/or pedometer, in order to assess the physical condition, level of activity and/or ability of the wearer, and their ability or capacity to move dynamically in response to an alert and automatically adjust the mode and/or range of the system Thus, users who are able to move more quickly can have detection zones that are smaller, while users who move more slowly (e.g., elderly, small children, etc.) can have detection zones that are larger to allow them more time to respond.

In some cases, sensors 274 can refer to one or more of a stationary internet of things (IoT) device(s) ("smart sensors") that communicate over a network. Smart sensors could comprise any of a variety of different IoT devices and other smart devices that may include one or more sensors. The smart sensors can be located in the apparel itself, or be stationed at other positions on or around the user, and be wirelessly connected to the system controller 282. Supplemental data from such smart sensors can be received by the system and used to determine routes and areas of danger and/or safety with more precision.

In different embodiments, data collected by sensors 274 can be used by the system 200 to identify potential intersection events and can also present navigational to help guide a person to a safe position relative to the other person. In FIG. 2, data is transmitted to a sensor data processor 220 which prepares the data for use by data integration module 210.

As noted earlier, in different embodiments, the emitter(s) 272 and detector(s) 276 can be connected to system controller 282 that is processor based and is configured to control system processes. In one embodiment, the system controller 282 includes a transceiver that enables RF communication with user device 280. The controller 282 is further coupled to memory (not shown in FIG. 2), containing firmware and software (e.g., modules of data manager 240) and, optionally, RAM storage (not shown in FIG. 2) for data acquired by the system. The controller 282 regulates the sending sonar pings. These pings produce the detection zone described above. The various detectors recover echoes from objects and these echoes permit the controller 282 to resolve a 3-D spatial environment via data integration module 210.

In different embodiments, the system controller 282 is integrated or embedded or otherwise connected to the sensors. The controller may include various computing and communications hardware, such as servers, integrated circuits, displays, etc. Further, a controller may include a device processor and a non-transitory computer readable medium including instructions executable by device processor to perform the processes discussed herein. The components of controller may be implemented in association with a mobile device, such as smart phone or tablet, and/or be in communication with a cloud-based control center or conditions monitoring center via a network connection. Thus, in different embodiments, a controller may include networking hardware configured to interface with other nodes of a network, such as a LAN, WLAN, or other networks. In some embodiments, the controller may be configured to receive data from a plurality of sources and communicate information to one or more external destinations. Accordingly, a controller may include a receiver and a transmitter. It will be appreciated that, in some embodiments, the receiver and transmitter may be combined in a transceiver. Any suitable communication platforms and/or protocols may be utilized for communication between the controller and other components of the system. Since the various sources of information may each have their own platform and/or protocol, the system may be configured to interface with each platform and/or protocol to receive the data.

In some embodiments, the computer readable medium may include instructions executable by the device processor to perform steps including receiving data from one or more devices or sensors. In some embodiments, computer readable medium may include instructions for receiving data from one or more wearable sensors. For example, the system may also include or communicate with a device that further includes a display configured to display data, which may include messages, information, and/or interactive options for the user to submit requests or responses to the system. While in some embodiments the display is provided with system, for example, as a panel display embedded on the article, in other embodiments, the system may be configured to display information on user's own device.

Furthermore, in some embodiments, the data integration module 210 receives data from sensor data processor 224 that is associated with controller 282. In some embodiments, the processor 224 may be configured to combine and process data captured by the one or more sensor(s) 274 to generate an output for an object detection module 212. The object detection module 212 makes an initial determination as to whether the current set of data indicates a high likelihood of an object in proximity (i.e., within the detection zone) to the article 290. A person detection model 214 can for example incorporate a signal processing algorithm that is able to detect the walking movement of a person, or the overall shape of a human, based on the ultrasonic sensor data. In addition, in some embodiments, a direction determination module 216 can identify the specific emitter or emitter(s) that received the echoed wave in order to determine from which direction the person is approaching. In such cases, the system can be configured to select a speaker that is oriented toward the determined direction (via speaker selector 218) to better target the alert generated by a warning manager 220. Finally, alert generator 222 causes presentation of an audible sound such as a beep, whistle, music, tone, or words from a speaker associated with the system. The alert presented can vary in response to the direction determined, as well as the user's selected preferences.

In another example in which thermal sensor data is collected, the output may include a map of temperatures (temperature data) of the transmission field. In one embodiment, the person detection model 214 analyzes the map of temperatures to identify a zone of interest that includes temperature values that correspond to body temperature values of the subjects being identified. For example, if the subject being identified is a human, then the model 214 may look for the zone of interest in the map that includes the temperature centered in the range of the temperature of the human body, i.e., between 35 and 40 degrees Celsius. If the system determines the human temperature may be greater than a preselected threshold (for example, corresponding to a fever) a special warning may be triggered by warning manager 220. The threshold may also depend upon the place in the body at which the measurement is made, the time of day, as well as the activity level of the person. The body temperature of a healthy person may vary during the day by about 0.5° C. (0.9° F.) with lower temperatures in the morning and higher temperatures in the late afternoon and evening; and body temperature also changes when a person is hungry, sleepy, sick, or cold. Thus, in one example, if the system determines that an object with a high likelihood of being a person is associated with a temperature above 40 degrees Celsius, it may present a particular type of alert to the wearer.

In some optional embodiments, particularly in cases where the user is expected or encouraged to customize their monitoring experience, the system is configured to work in conjunction with a user device 280 such as a mobile device, tablet, smartwatch, smartglasses, or other computing device in order to present interactive options and control mechanisms to the user. For example, a user application ("application" or "app") 230 may be provided by which the user can create and maintain/manage a profile or user account 234 and/or adjust various settings and preferences 236. In some embodiments, the application can be downloaded directly to the user's device 280 or can be accessible locally via a wired or wireless link (e.g., Bluetooth® or other NFC device) from the controller 282 to the user's own computing device. In some embodiments, the app 230 is accessible via a remote cloud service, while in other embodiments, the app 230 resides entirely on the user device 280 and/or the system controller 282. The app 230 can in some cases offer a system interface for accessing and modifying settings in the system. In some embodiments, the application can be configured to connect a user's device (for example, via a Bluetooth, WiFi, wired, or cellular connection) to the hardware assembly 270 to adjust user preferences 236, such as the user's desired alert preferences (e.g., audio volume, type, intensity, message, frequency, etc.) for each detection zone breach event. However, as noted above, even in cases without a user device 280, the user may be able to interact with and control operations of the system. For example, the controller can include or be connected to mechanical buttons or other mechanisms by which the user can adjust various system settings and/or power the system on or off. Furthermore, in one embodiment, the user can access a dashboard 232 that can present the user's preferences and, in some cases, depict a visualization of the number of persons in close proximity to the user.

In different embodiments, the application can be configured to offer content via native controls presented via an interface. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user.

For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation. In some embodiments, the application can also offer users access to a status monitor dashboard that may be used to track and view past alerts, messages, and updates regarding crowds nearby and potential areas to avoid.

Figure 3:
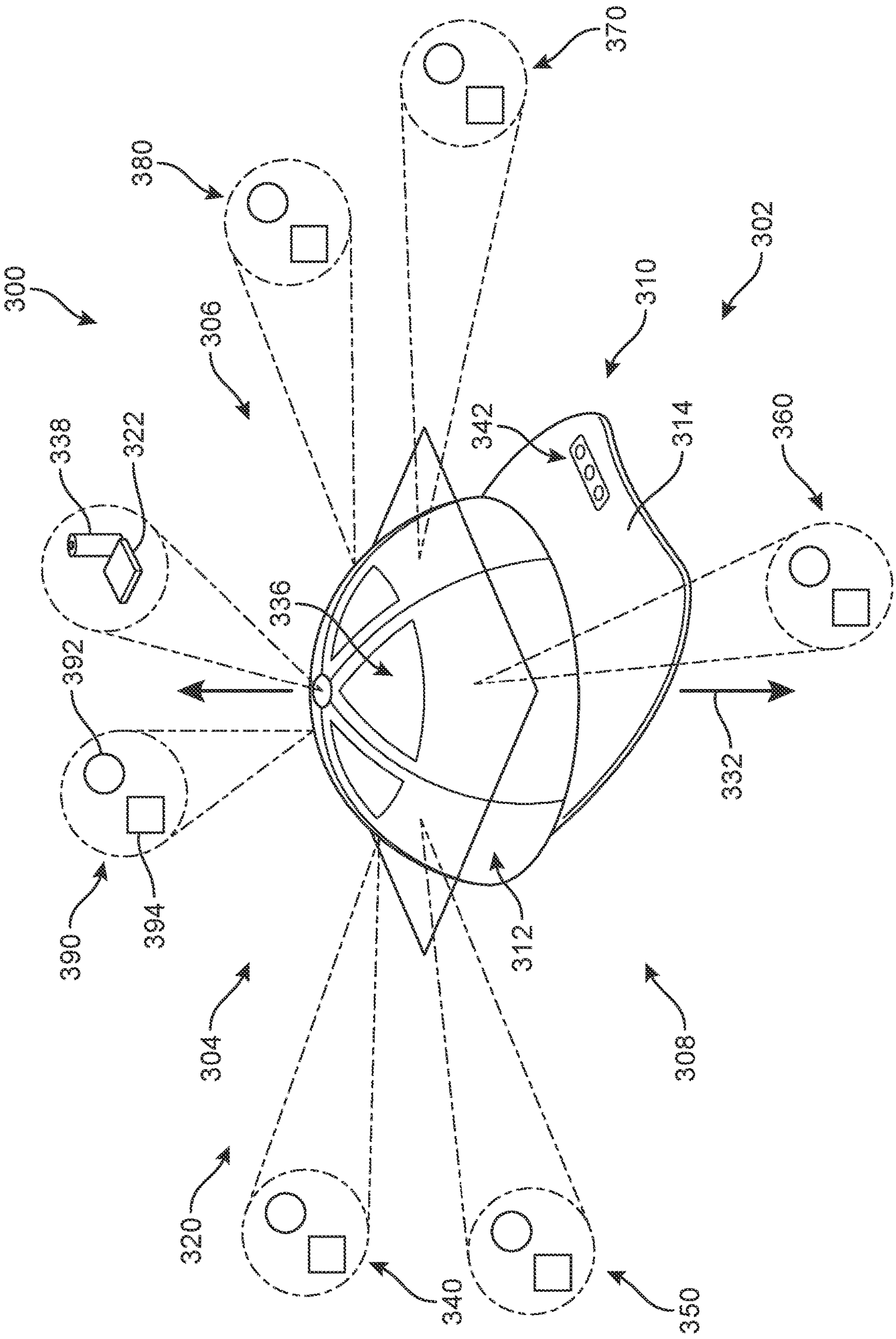
FIG. 3 is a schematic illustration of an apparatus (article of apparel) in which an embodiment of a proximity alert system is incorporated that includes multiple proximity sensors facing different directions, according to an embodiment.
Figure 4:
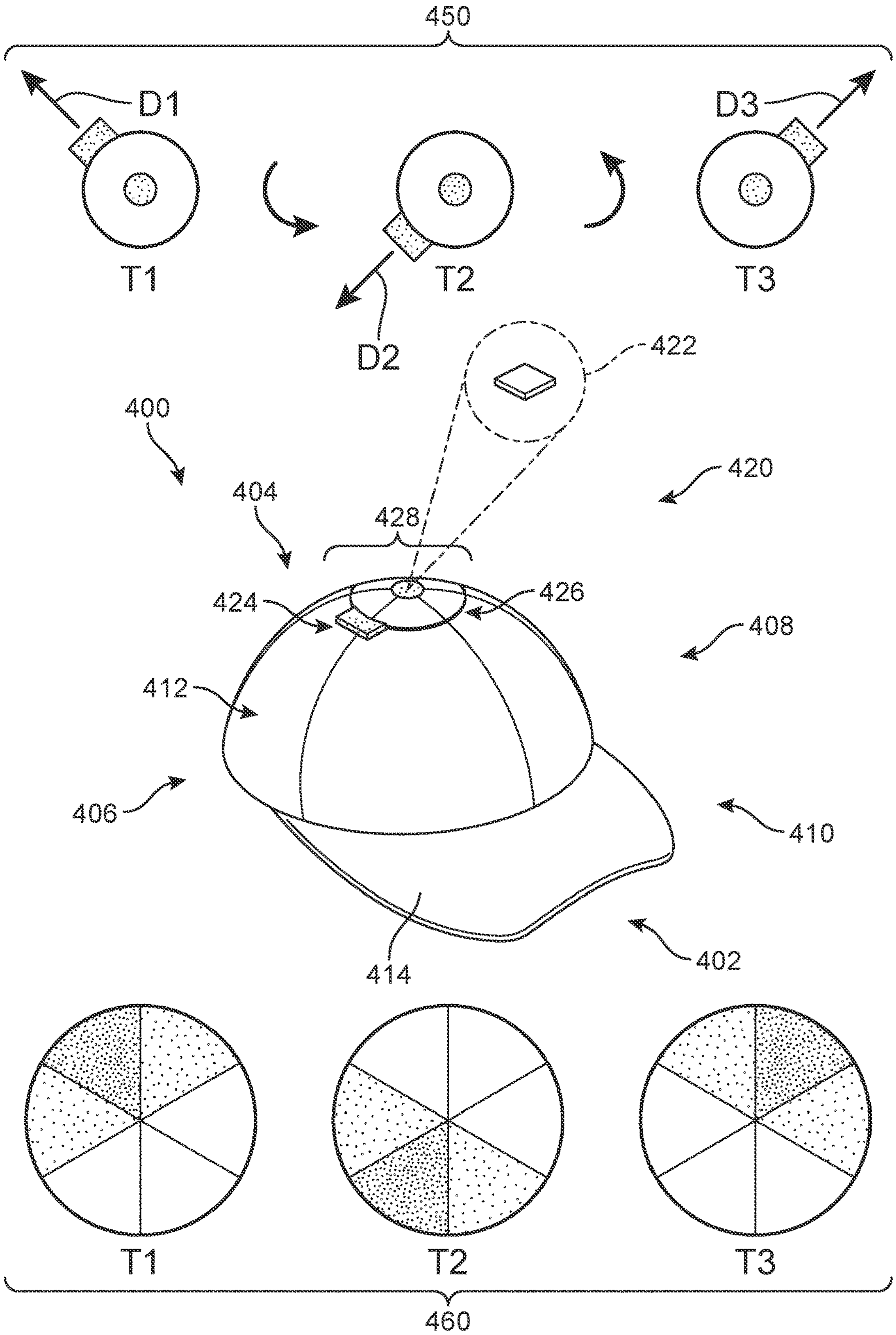
FIG. 4 is a schematic illustration of an apparatus (article of apparel) in which an embodiment of a proximity alert system is incorporated that includes a sensor unit that is configured to rotate in order to create a detection zone, according to an embodiment.
Figure 5:
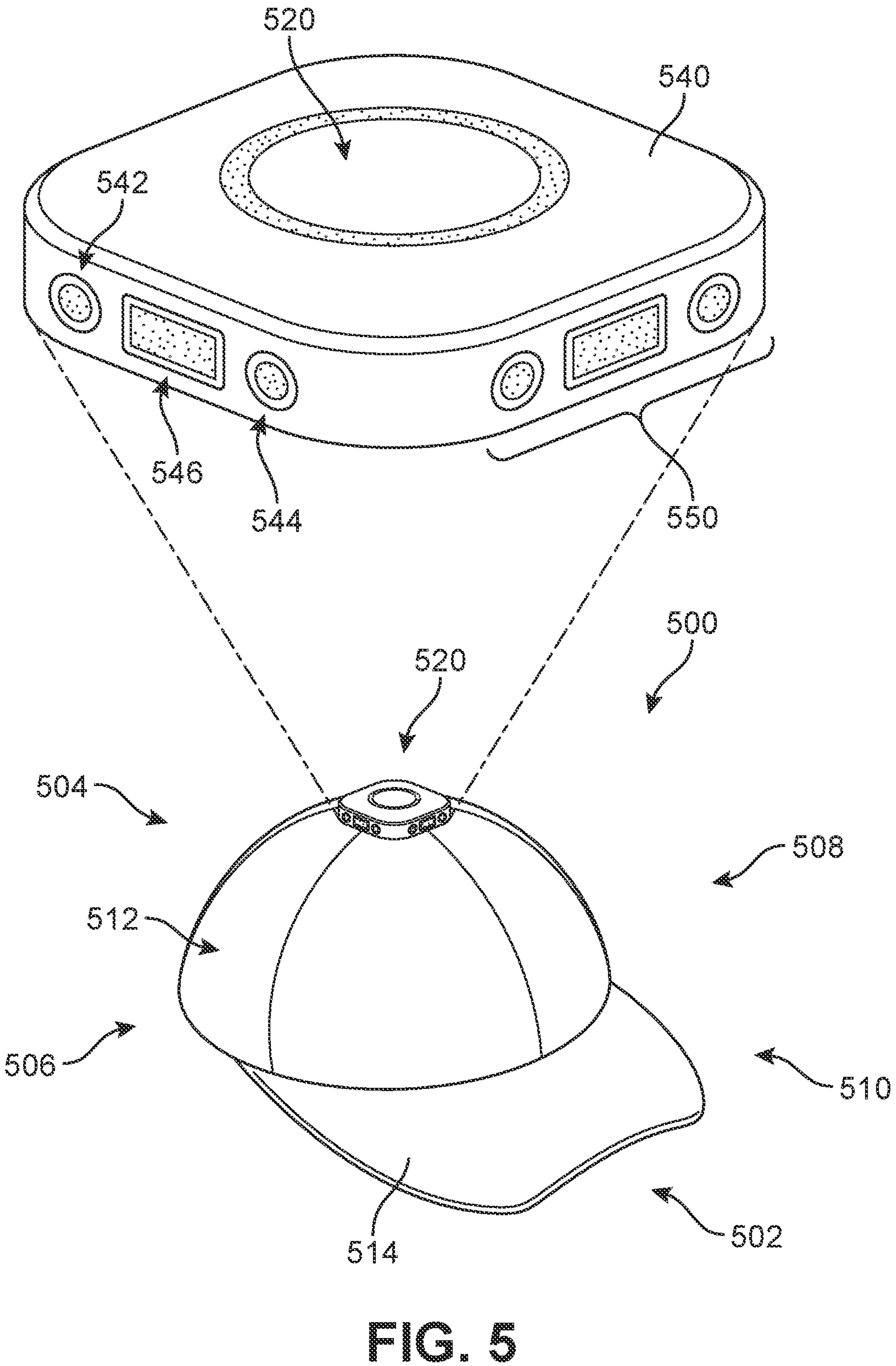
FIG. 5 is a schematic illustration of an apparatus (article of apparel) in which an embodiment of a proximity alert system is incorporated as a unitary device, according to an embodiment.

FIGS. 3-5 depicts three embodiments of the proposed system and apparatus. In FIG. 3, a first apparatus 300 is depicted in which a first system 320 is installed or otherwise disposed in a first headwear 310, shown here for purposes of simplicity as a baseball cap. The first headwear 310 includes a half-spherical body portion 312 (the body portion can also referred to as a crown), to which an optional brim portion 314 is attached that is associated with a front region 302 of the cap. A rear region 304 is on the opposite end, and a first side region 306 and an opposing second side portion 308 each extend between the front region 302 and the rear region 304. It can be observed that the body portion 312 includes a plurality of sensors 390 embedded, attached, or otherwise disposed along an exterior surface. Simply for purposes of this example, there are six sensor units (first unit 330, second unit 340, third unit 350, fourth unit 360, fifth unit 370, and sixth unit 380), each including at least an emitter 392 and a detector 394. In other embodiments, other sensors may be included with each unit, as discussed above with respect to FIG. 2.

In different embodiments, the sensors 390 are arranged around the body portion 312 at approximately regular intervals such that the distance between two adjacent sensor units is similar. In one embodiment, each sensor unit faces outward to emit/receive along a different direction relative to a central axis 332 (here extending vertically through the top/center of the cap). In one embodiment, some or all of the sensor units can be disposed along the same plane (e.g., plane 334) relative to one another. In some embodiments, the sensor units can be positioned such that a signal produced by the emitter extends at a tangent relative to the surface of the cap, while in other embodiments, the sensors can be angled or oriented to face slightly downward. In addition, a first controller 322 is disposed at a relative center of the top of the body portion 312.

In some embodiments, solar panels can also be disposed along an exterior surface of the article. For example, in FIG. 3, a plurality of solar panels 336 are attached to the upper portion of the body portion 312, facing upward to allow for optimal exposure to sunlight when the article is worn. In this case, the solar panels 336 are connected to a rechargeable battery 338, and generate electric current for use by the first system 300. Although such solar panels 336 are illustrated only in FIG. 3, it should be understood that any of the embodiments described herein can incorporate one or more solar panels in various shapes for supplying power to the system. In addition, in FIG. 3, a user control interface 342 is embedded in the brim 314 of the article, with switches that can be used to control settings and operational features of the system such as volume, power, modes, alert types, etc. Other components described in FIG. 2 are not shown, but can be understood to be included in the first system 310. The proposed arrangement allows for a substantially uniform scan of the environment around the user (wearing the cap) and provides consistent coverage even as the user turns his or her head.

In FIG. 4, a second apparatus 400 is depicted in which a second system 420 is installed or otherwise disposed in a second headwear 410, shown here for purposes of simplicity as a baseball cap. The second headwear 410 includes a half-spherical body portion 412, to which an optional brim portion 414 is attached that is associated with a front region 402 of the cap. A rear region 404 is on the opposite end, and a first side region 406 and an opposing second side portion 408 each extend between the front region 402 and the rear region 404. It can be observed that the body portion 412 includes a sensor assembly 428 comprising a guide rail 426 and a sensor unit 424. In different embodiments, the sensor assembly 428 includes mechanical provisions for moving the sensor unit 424 around the outer circumference of the cap. For example, the sensor unit 424 can be securely and/or movably mounted or connected to the guide rail 426, whereby that a signal from a second controller 422 causes the sensor unit 424 to glide or otherwise move around the cap on the guide rail 426. In one embodiment, the sensor unit 424 can travel on the guide rail 426 in a manner similar to a train moving on train tracks. In other embodiments, the guide rail 426 itself can be configured to rotate, and the sensor unit 424 remains stationary relative to the guide rail 426 while being moved around the cap. The sensor unit 424 can be encased in a waterproof housing. In one embodiment, the housing includes provisions for movable connection to the guide rail 424.

In some embodiments, the sensor unit 424 can be positioned such that a signal produced by the emitter extends at a tangent relative to the surface of the cap, while in other embodiments, the sensor unit 424 can be angled or oriented to face slightly downward. In addition, the second controller 422 is disposed at a relative center of the top of the body portion 412. A battery, charging port, and other components described in FIG. 2 are not shown, but should be understood to be included in the second system 410. The arrangement allows for a substantially uniform scan of the environment around the user (wearing the cap).

Simply for purposes of illustration, an embodiment of an operation of the sensor assembly 428 is presented schematically in top-down view 450. In this example, at a first time T1, the sensor unit 424 is positioned toward the rear region 404 of the cap, such that the sensor unit faces toward a first direction D1. At a second (subsequent) time T2, a first rotation has occurred whereby the sensor unit 424 is now positioned toward the first side region 406 such that the sensor unit faces a second direction D2. At a third (subsequent) time T3, a second rotation has occurred whereby the sensor unit 424 is positioned toward the second side region 408 such that the sensor unit faces a third direction D3. In other words, while there is only a single sensor unit 424, the motion of the unit around the cap allows for a detection zone similar to that of the first system 300 of FIG. 3.

In some embodiments, the rotation can be substantially continuous, and offer 360 degree coverage, while in other embodiments, the rotation can be stop-and-start, as desired by the user. The sensor assembly 428 is further configured to communicate wirelessly with the second controller 422, which will transmit a plurality of control signals that will cause (a) the sensor unit 424 to actively obtain data, (b)

power to be supplied to the sensor assembly 428 that determines the speed/frequency of the rotation, and (c) whether the sensor unit 424 should be stationary for periods to create partial detection zones. As discussed above, the sensor unit 424 includes at least an emitter and a detector. In other embodiments, as discussed above with respect to FIG. 2, other sensors may be included with the sensor unit, or one or more additional sensor units with other sensors may be connected to the guide rail 426.

In different embodiments, the rotation would also allow the system to orient a speaker toward the detected person and provide a dynamic targeted alert mechanism. In other words, once the direction of the approaching person is determined, the second controller 422 can cause the sensor unit 424 to rotate until facing the determined direction, and present an audio message in that direction. As shown in a schematic diagram 460, in cases where the sensor unit 424 includes a speaker, at the first time T1, the speaker will be facing toward rear region 404, allowing for the presentation of audio that will be heard from those behind the user. At T2, the speaker would be facing the first side 406, such that audio would be heard primarily in that direction, while at T3, the speaker would face the second side 408, such that audio would be heard in the opposite direction. Such targeted alerts can reduce the likelihood of bystanders mistakenly believing the alert is for them. In another embodiment, the headwear could include an array of directional speakers that are arranged around the cap to cover 360 degrees. To provide a message to a user in a particular direction, the message may be emitted by only one or two of the directional speakers already pointed in the direction of the user In FIG. 5, a third apparatus 500 is depicted in which a third system 520 is installed or otherwise disposed in a third headwear 510, shown here for purposes of simplicity again as a baseball cap. The third headwear 510 includes a half-spherical body portion 512, to which an optional brim portion 514 is attached that is associated with a front region 502 of the cap. A rear region 504 is on the opposite end, and a first side region 506 and an opposing second side portion 508 each extend between the front region 502 and the rear region 504.

In this example, the third system 520 has been installed at the top of the body portion 512, and is contained in a single housing 540. A third controller 522 can communicate with the system components via a wired or wireless mechanism. A detection assembly 550 is disposed along each of four sides of the housing 540, such that emitters (e.g., a first emitter 542 and a second emitter 544) are directed in different directions, providing substantially 360 coverage. A detector 546 is disposed between the emitters. Upon detecting the presence of a person, the 'triggered' detector can be immediately identified and used to select the side from which the produce an audible alert.

In different embodiments, the third system 520 can be understood to provide a detachable device that can be moved from one article of apparel to another with relative ease, providing users with wider range of options in their day to day garment selections. In addition, charging is also simplified, as the device can be removed from the article and more easily connected to a charging port. In some cases, a hook and loop fastener may be used. In other embodiments, any other removable and reusable fastener known in the art may be used to attach the device to the article.

In some embodiments, the detection assemblies can be positioned such that a signal produced by the emitter extends at a tangent relative to the surface of the cap, while in other embodiments, the sensors can be angled or oriented to face slightly downward. A battery, charging port, and other components described in FIG. 2 are not shown, but should be understood to be included in the third system 510. The arrangement allows for a substantially uniform scan of the environment around the user (wearing the cap) and provides consistent coverage even as the user turns his or her head.

Figure 6:
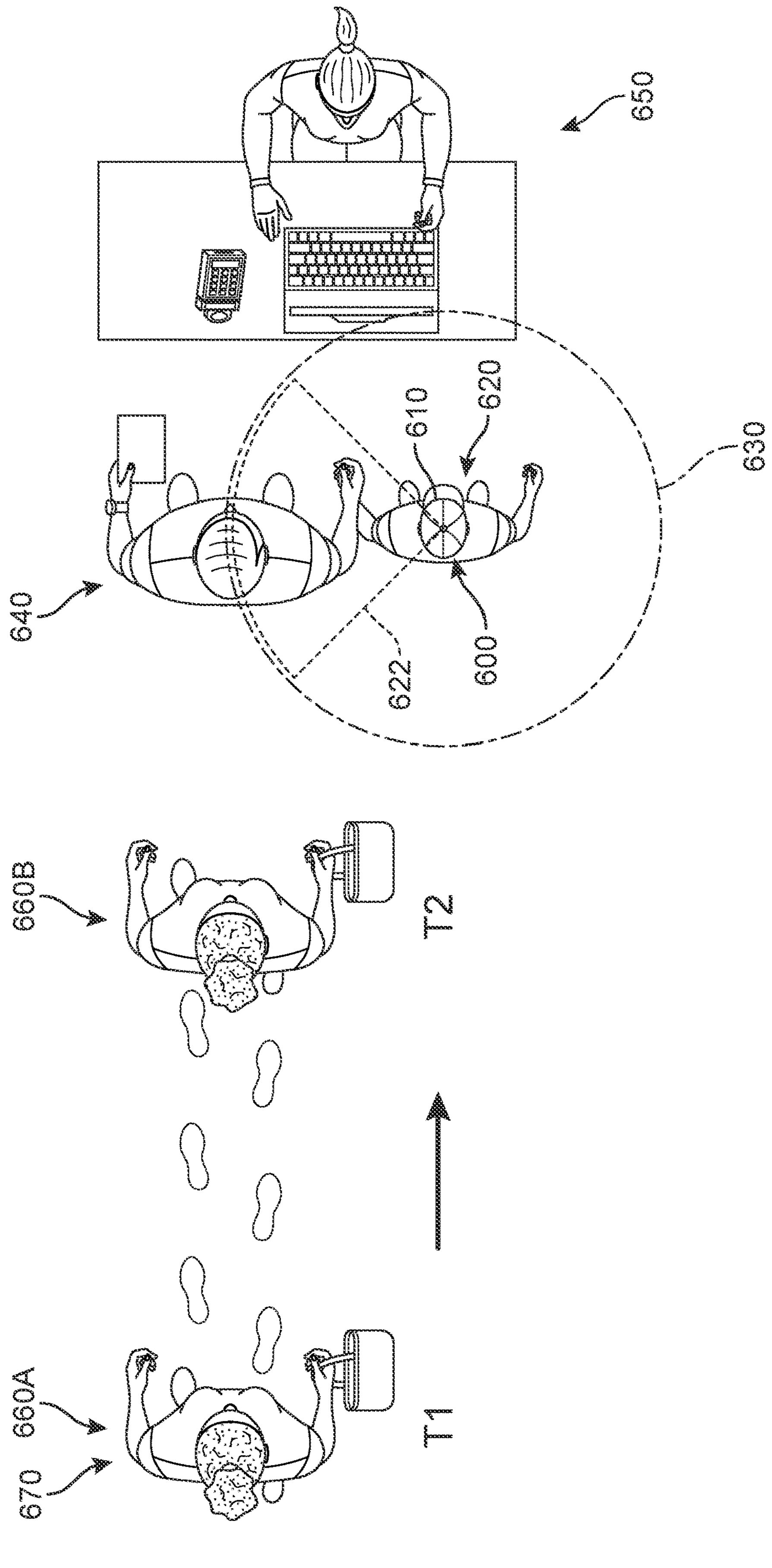
FIGS. 6 and 7 depict an example of a child utilizing an embodiment of the proximity alert system, according to an embodiment.
Figure 7:
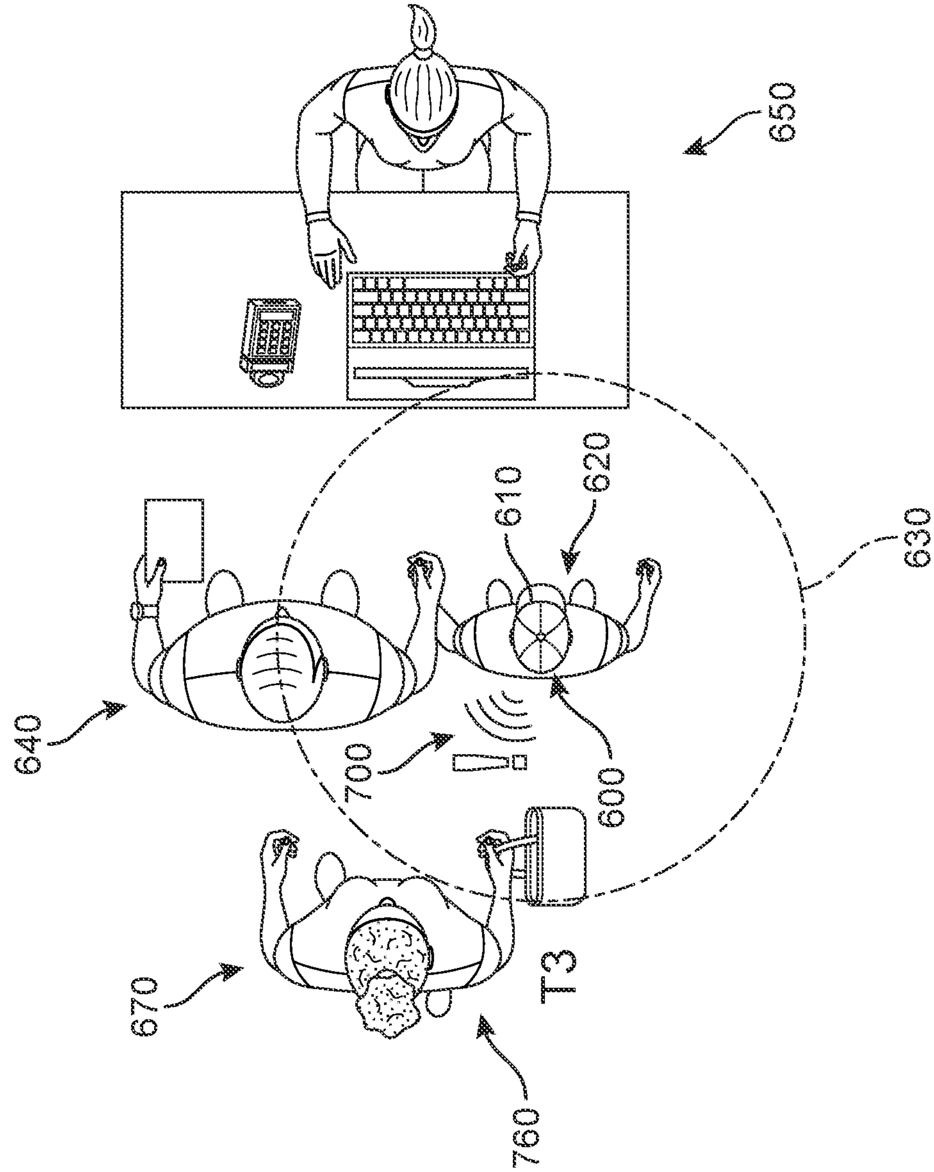

For purposes of clarity, some examples of the proposed systems in use are depicted in FIGS. 6-8B. A first example is shown in FIGS. 6 and 7, where a child 620 is waiting in a queue with his father 640 near a checkout counter 650 at a store. The child 620 is wearing a fourth system 600, installed in cap 610, which produces a detection zone 630 around the child 620. In this case, the father 640 has adjusted the range of the detection zone 630 (for example, via the user controls or access to the user interface for app) by removing a wedged region 622 along one side of the child 620. The wedged region 622 therefore remains dormant or non-responsive, allowing the father 640 to remain at his child's side without triggering the fourth system 600. Behind the father 640 and child 620, another shopper 670 is moving forward toward the same checkout counter 650. At a first time T1, the shopper 670 is at a first position 660*a*, and at a second time T2, the shopper 670 has moved to a second position 660*b* that is closer to child 620. However, the shopper 670 remains outside of the detection zone 630 at this time.

In FIG. 7, the shopper 670, at a third time T3, moves again to a third position 760, and has now entered the perimeter for the detection zone 630. In response, the fourth system 600 emits an audible alert 700 in the direction of the shopper 670 warning the shopper 670 to move away from the child 620. Thus, the proposed systems can be implemented not only to promote healthy interactions, but to provide a protected personal space around a person who may be vulnerable or otherwise unable to assert themselves.

Figure 8A:
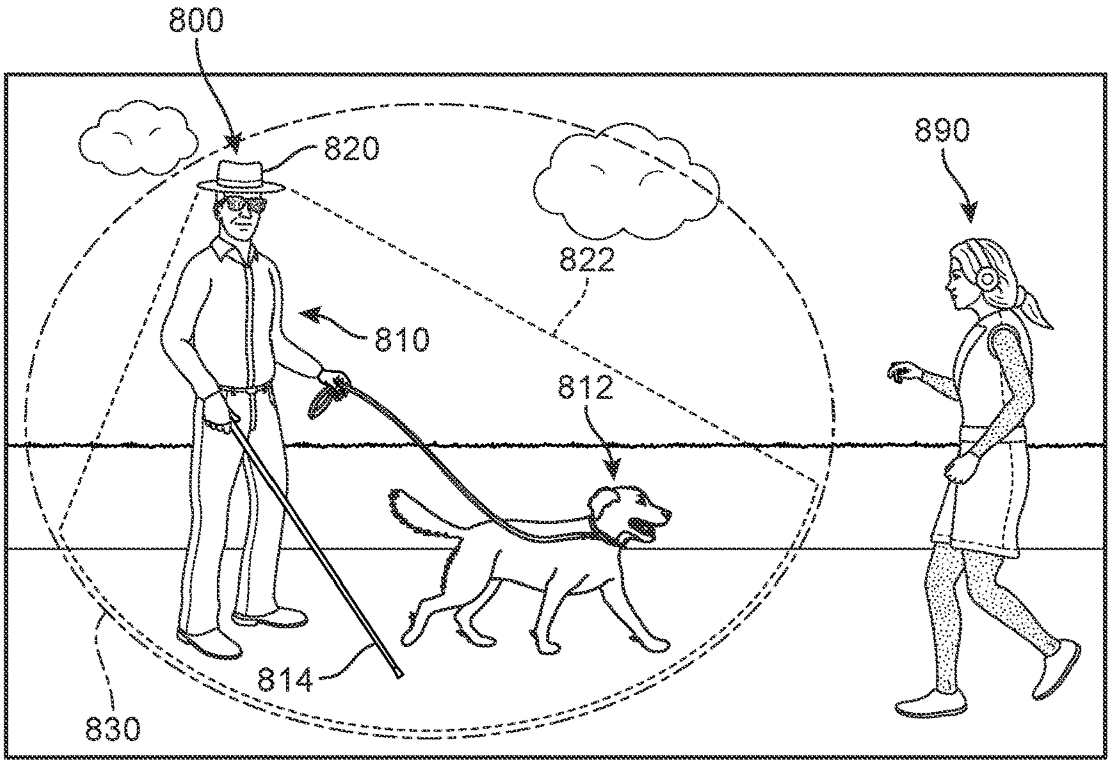
FIGS. 8A and 8B depict an example of a visually impaired person employing a wearable proximity alert system, according to an embodiment.
Figure 8B:
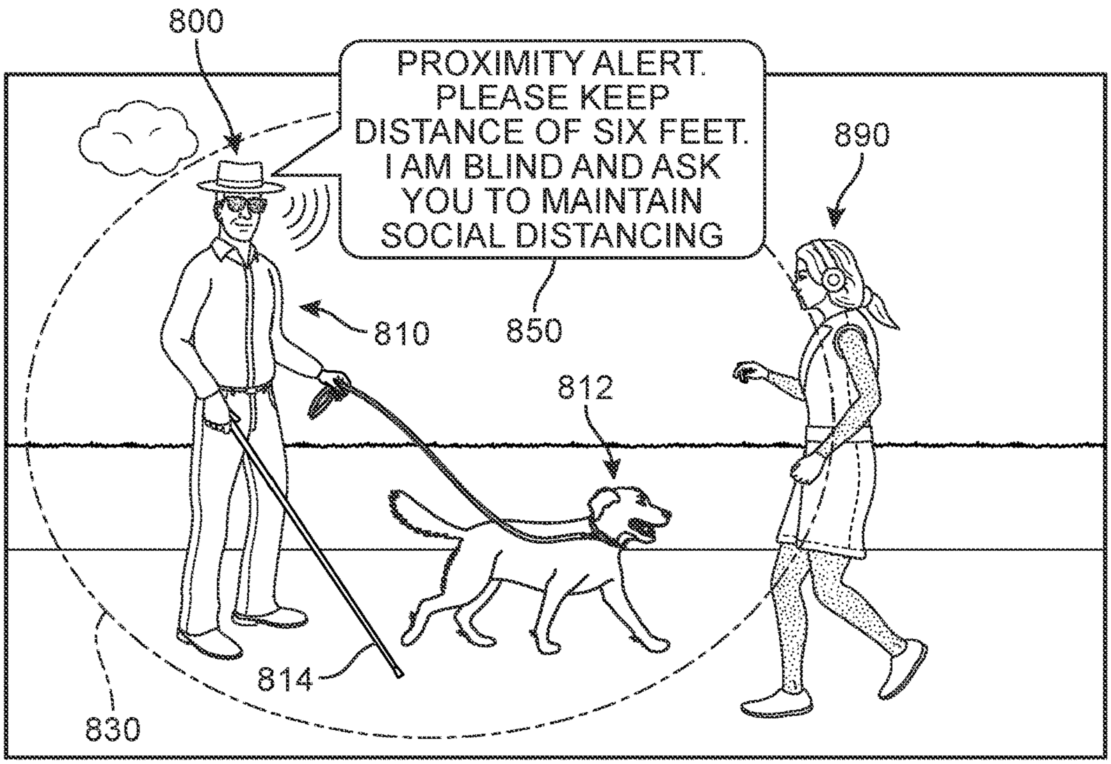

A second example is shown with reference to FIGS. 8A and 8B. In this case, a visually impaired user 810 is walking in a park with a guide dog 812. The user 810 is wearing a fifth system 800, installed in hat 820, which produces a detection zone 830 around the user 810. As the user 810 is walking with an animal, he has adjusted the settings such that a forward-facing region has a greater area relative to the rearward-facing region of the detection zone 830, in order to provide him with sufficient reaction time when a person is detected. Furthermore, in this case, the user 810 has adjusted the range of the detection zone 830 (for example, via the user controls or access to the user interface for app) by removing a wedged region 822 that encompasses a downward-facing region just ahead of him. This adjustment reduces the likelihood of false triggers with respect to the user's white cane 814 (a mobility device) and the guide dog 812. Thus, the approach of someone (runner 890) outside of the wedged region 822 but within the detection zone 830 causes the presentation of a custom warning message 850 ("Proximity alert. Please keep distance of six feet. I am blind and ask you to maintain social distancing") selected or recorded by the user 800.

Figure 9:
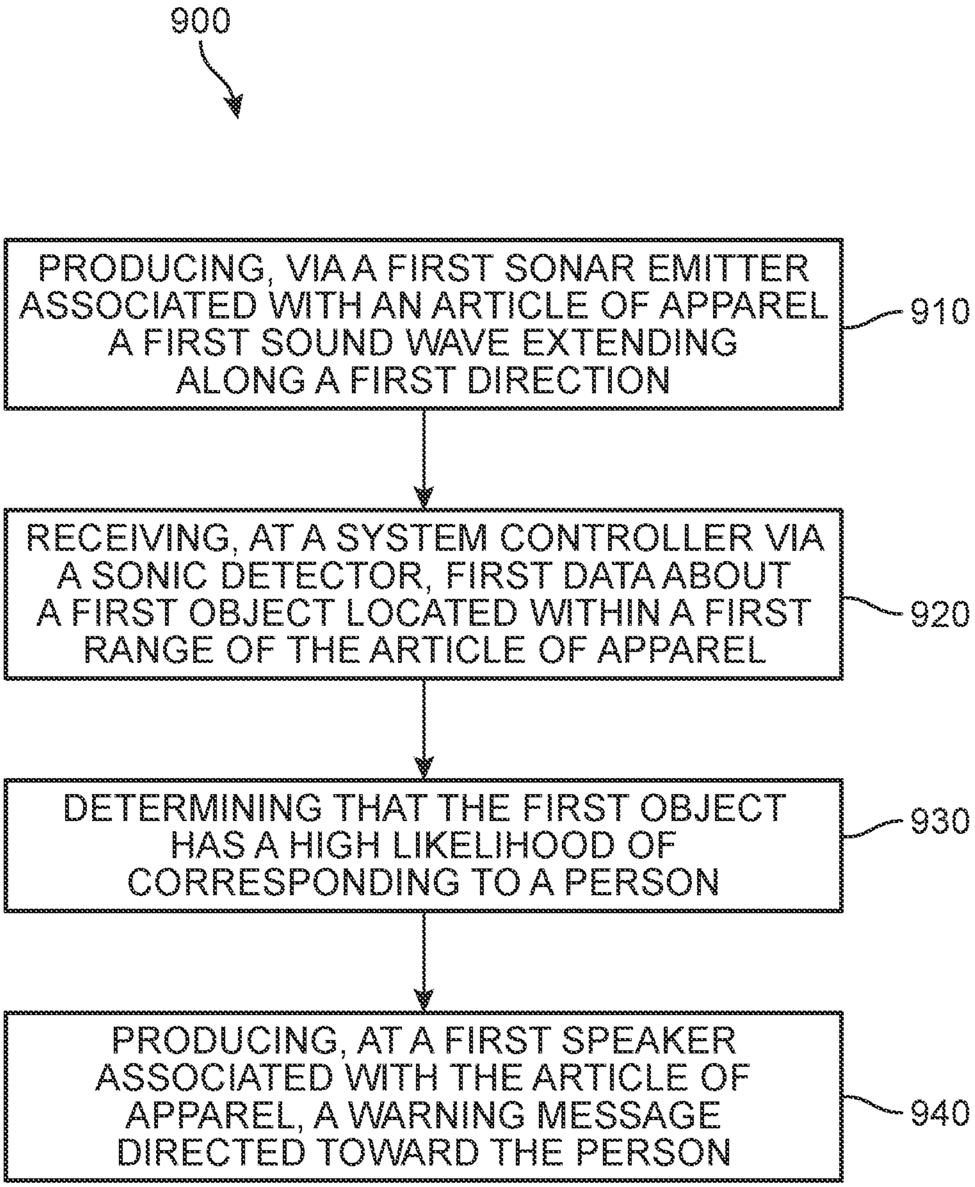
FIG. 9 is a flow chart depicting a process of promoting social distancing by generating alerts when someone approaches the user, according to an embodiment.

FIG. 9 is a flow chart illustrating an embodiment of a method 900 of promoting social distancing and providing alerts to users of a wearable proximity alert system and other persons. A first step 910 includes producing, via a first sonar emitter associated with an article of apparel, a first sound wave extending along a first direction, and a second step 920 includes receiving, at a system controller and from a first sonar detector associated with the article of apparel, first data about a first object located within a first range of the article of apparel (i.e., based on the received echoed signal).

A third step 930 includes determining, at the system controller, that the first object has a high likelihood of corresponding to a person, and a fourth step 940 includes producing, at a first speaker associated with the article of apparel, a warning message directed toward the person.

In other embodiments, the method may include additional steps or aspects. In one embodiment, the method 900 can also include a step of supplying a current to a rechargeable battery providing power to at least the system controller via one or more solar panels disposed on an exterior surface of the article of apparel. In another example, the method 900 can include producing, via a second sonar emitter associated with the article of apparel, a second sound wave extending along a second direction that differs from the first direction. In some embodiments, the first speaker faces the first direction, and the article of apparel further includes a second speaker facing the second direction. In such cases, the method can also include steps of determining, at the system controller, that the person is approaching from the first direction, and producing the warning message only from the first speaker. In one embodiment, the article of apparel is a type of headwear, and the method further includes a step of causing, via the system controller, a mechanical rotation of the first sonar emitter around a perimeter of a crown of the headwear. In another example, the method 900 can include steps of receiving, at the system controller and from a thermal sensor disposed adjacent to the first sonar emitter, thermal data, determining the thermal data indicates a high likelihood of the person experiencing a fever, and producing an audible alert directed toward a wearer of the article of apparel.

In different embodiments, the proposed system can be implemented with various arrangements, as described earlier with respect to FIGS. 3, 4, and 5. As one example, a wearable proximity alert system for an article of apparel can include a plurality of sonar emitters disposed along multiple regions of the article of apparel, each sonar emitter configured to produce a sound wave that travels in a specified direction relative to a central axis of the article of apparel, a plurality of sonar detectors disposed in the article of apparel, each sonar detector configured to detect sonic echoes reflected off objects in response to the sound waves produced by the plurality of sonar emitters, and a system controller configured to communicate with the plurality of sonar detectors to determine when there is a high likelihood of a detected object representing a person.

In some embodiments, the article of apparel is a type of headwear, and the plurality of sonar emitters are arranged at regular intervals around a body portion of the headwear. In another example, each of the plurality of sonar emitters are paired with and disposed adjacent to a sonar detector. In one embodiment, the system controller is disposed toward a topmost center of the body portion of the headwear. In still another embodiment, the system also includes a rechargeable battery and solar panels, where the rechargeable battery is connected to one or more solar panels disposed on an exterior surface of the article of apparel. In some examples, each of the plurality of sonar emitters are further paired with a thermal sensor. In one embodiment, each of the plurality of sonar detectors is wirelessly connected to the system controller, enabling communication and the transmission of control signals. In some embodiments, the system also includes a user control interface embedded in a portion of the article of apparel that is configured with switches that allow a user to change the operation of the system.

As another example, a wearable proximity alert system for headwear is disclosed. The system includes a substantially O-shaped guide rail extending around an exterior surface of a body portion (crown) of the headwear, a sensor unit including a sonar emitter configured to produce a sound wave and a sonar detector configured to detect sonic echoes reflected off objects in response to the sound wave produced by the sonar emitter, the sensor unit being mounted on the guided rail, and a system controller configured to manage a rotational motion of the sensor unit around the body portion, such that the sound waves produced by the sonar emitter travel in a first direction at a first time, and in a different, second direction at a subsequent, second time.

In some embodiments, the guide rail serves as a stationary track on which the sensor unit travels in a circle. In another example, the guide rail and the sensor unit remain stationary relative to one another as the guide rail is rotated around the body portion. In one embodiment, the sensor unit further comprises a speaker, and the system is configured to present an audible alert from the speaker. In some examples, the system includes a rechargeable battery and solar panels, and the battery is connected to one or more solar panels disposed on an exterior surface of the headwear.

In still another example, a wearable monitoring and alert system includes an article of apparel including one or more emitter(s) and receiver(s)/detector(s), and a system controller associated with the article of apparel that further includes a processor and machine-readable media including instructions. The instructions, when executed by the processor, cause the processor to receive first data about the physical environment in a sensor range of the article of apparel from the emitter/detector, and to determine, based on the first data, that an obstacle corresponding to a person (human) is in the vicinity of the system user. In addition, in some embodiments, the instructions cause the processor to receive second data about a temperature associated with an object as well as a speed and direction of the object during a first time period from a first second sensor, and to determine, based on the second data, that the person may have a fever or is moving toward the wearer of the article of apparel. Furthermore, the instructions can cause the processor to cause, in response to the determination that the object is in the vicinity (in the detection zone) of the user, and/or in response to the determination that a nearby person is experiencing a fever, a first alert to be generated by a first feedback component of the article of apparel, such as a speaker.

Furthermore, in some embodiments, a proximity alert system for an article of apparel includes a processor and machine-readable media including instructions that cause the processor to (a) produce, via a first sonar emitter associated with an article of apparel, a first sound wave extending along a first direction; (b) receive, at a system controller and from a first sonar detector associated with the article of apparel, first data about a first object located within a first range of the article of apparel; (c) determine, at the system controller, that the first object has a high likelihood of corresponding to a person; and (d) produce, at a first speaker associated with the article of apparel, a warning message directed toward the person. In some embodiments, the sonar emitter and speaker may refer to the same component, while in other embodiments, the sonar emitter and speaker are two separate components.

As described herein, the proposed systems and methods offer significant assistance and value to users, particularly those who are more vulnerable to personal safety issues in their environment. By including and employing multiple sensors and feedback components, the awareness of users of their surroundings can be enhanced and/or supplemented. As described herein, the wearable system could be used by people who are visually impaired or otherwise physically disabled to allow for a clearer path as they travel.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with, or substituted for, any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

We claim:

1. A wearable proximity alert system for an article of apparel, the system comprising:

a plurality of sonar emitters disposed along multiple regions of the article of apparel, each sonar emitter configured to produce a sound wave that travels in a specified direction relative to a central axis of the article of apparel;

a plurality of sonar detectors disposed in the article of apparel, each sonar detector configured to detect sonic echoes reflected off objects in response to the sound waves produced by the plurality of sonar emitters;

a system controller configured to communicate with the plurality of sonar detectors to determine when there is a high likelihood of a detected object representing a person within a pre-selected detection zone around a user wearing the article of apparel; and a mobile application running on a computing device associated with the user, whereby the detection zone is selected by the user via the mobile application to align with the user's desired coverage area, wherein the detection zone is adjustable by the user to remove a wedged region within which the wearable proximity alert system is dormant.

2. The system of claim 1, wherein the article of apparel is a type of headwear, and the plurality of sonar emitters are arranged at regular intervals around a body portion of the headwear.

3. The system of claim 2, wherein each of the plurality of sonar emitters are paired with and disposed adjacent to a sonar detector.

4. The system of claim 1, further comprising a rechargeable battery connected to one or more solar panels disposed on an exterior surface of the article of apparel.

5. The system of claim 1, wherein each of the plurality of sonar emitters are further paired with a thermal sensor.

6. The system of claim 1, wherein each of the plurality of sonar detectors is wirelessly connected to the system controller.

7. The system of claim 1, further comprising a user control interface embedded in a portion of the article of apparel.

8. The system of claim 1, further comprising one or more haptic feedback components that produce vibrations in order to convey information.

9. The system of claim 1, further comprising a rechargeable battery connected to a vibration energy harvesting device.

10. A method for promoting social distancing, the method comprising:

receiving, at a system controller and from a mobile application running on a computing device, a user selection of a first wedged region in a detection zone, thereby causing the first wedged region to be a dormant region within the detection zone;

producing, via a first sonar emitter associated with an article of apparel, a first sound wave extending along a first direction within the detection zone;

receiving, at the system controller and from the first sonar detector associated with the article of apparel, first data about a first object located within a first range of the article of apparel;

determining, at the system controller, that the first object has a high likelihood of corresponding to a person; and producing, at a first speaker associated with the article of apparel, a warning message directed toward the person only if the first object is within the detection zone and outside the first wedged region.

11. The method of claim 10, further comprising supplying a current to a rechargeable battery providing power to at least the system controller via one or more solar panels disposed on an exterior surface of the article of apparel.

12. The method of claim 10, further comprising producing, via a second sonar emitter associated with the article of apparel, a second sound wave extending along a second direction that differs from the first direction.

13. The method of claim 12, wherein the first speaker faces the first direction, and the article of apparel further includes a second speaker facing the second direction.

14. The method of claim 13, further comprising:

determining, at the system controller, that the person is approaching from the first direction; and producing the warning message only from the first speaker.

15. The method of claim 10, wherein the article of apparel is a type of headwear, and the method further comprises causing, via the system controller, a mechanical rotation of the first sonar emitter around a perimeter of a crown of the headwear.

16. The method of claim 10, further comprising:

receiving, at the system controller and from a thermal sensor disposed adjacent to the first sonar emitter, thermal data;

determining the thermal data indicates a high likelihood of the person experiencing a fever; and producing an audible alert directed toward a wearer of the article of apparel.

17. The method of claim 10, wherein the warning message is accompanied by a haptic feedback.

18. The method of claim 17, wherein a frequency of vibration of the haptic feedback increases as proximity to the first object increases.

19. The method of claim 17, wherein a frequency of vibration of the haptic feedback decreases as proximity to the first object decreases.

* * * * *